W. B. BUTLER.
CHANNELING MACHINE.
APPLICATION FILED JUNE 3, 1908.
925,287.
Patented June 15, 1909.
2 SHEETS—SHEET 2.
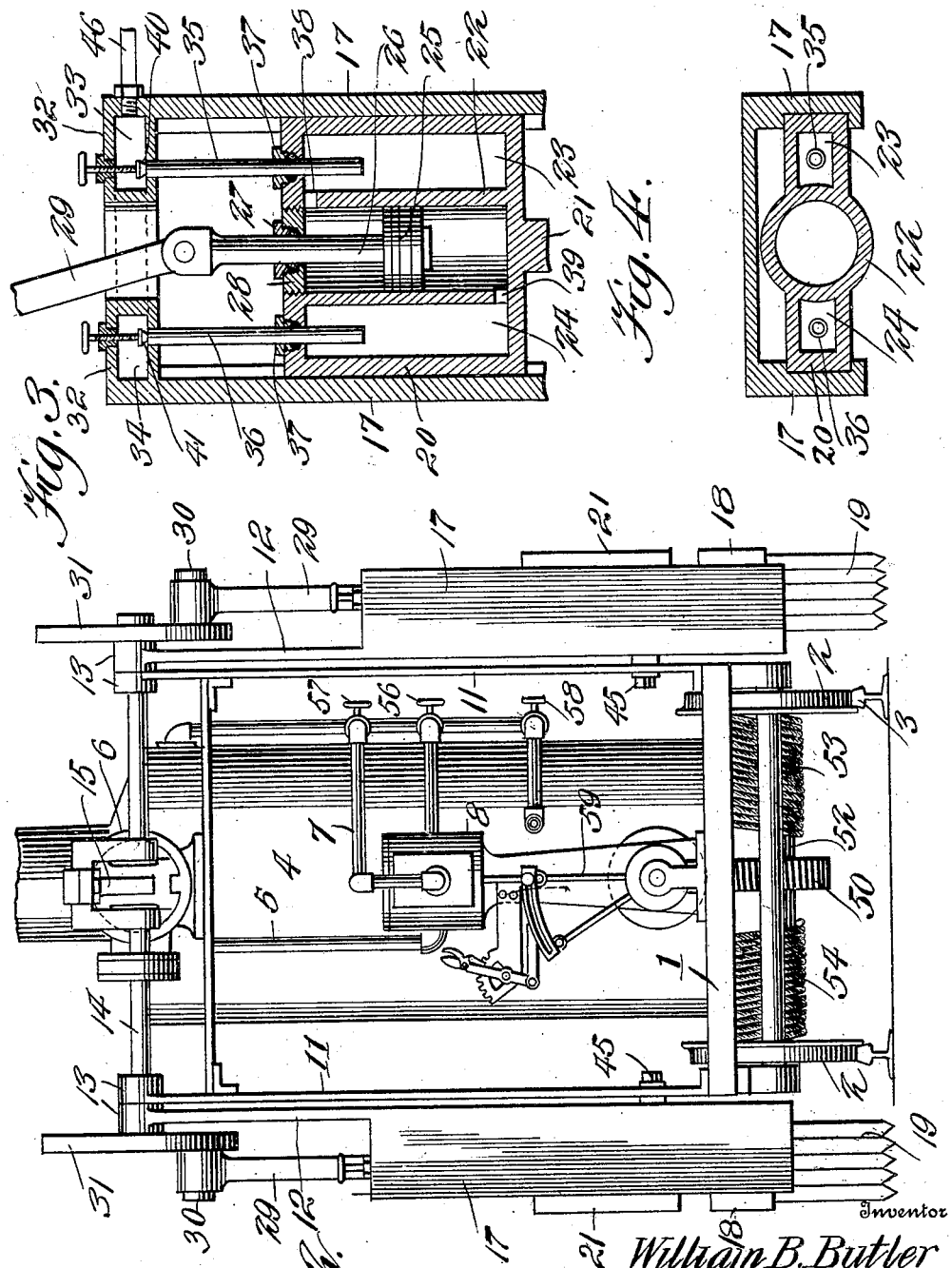
Witnesses
H. C. Ackman
P. M. Smith
Inventor
William B. Butler
By Victor J. Evans
Attorney

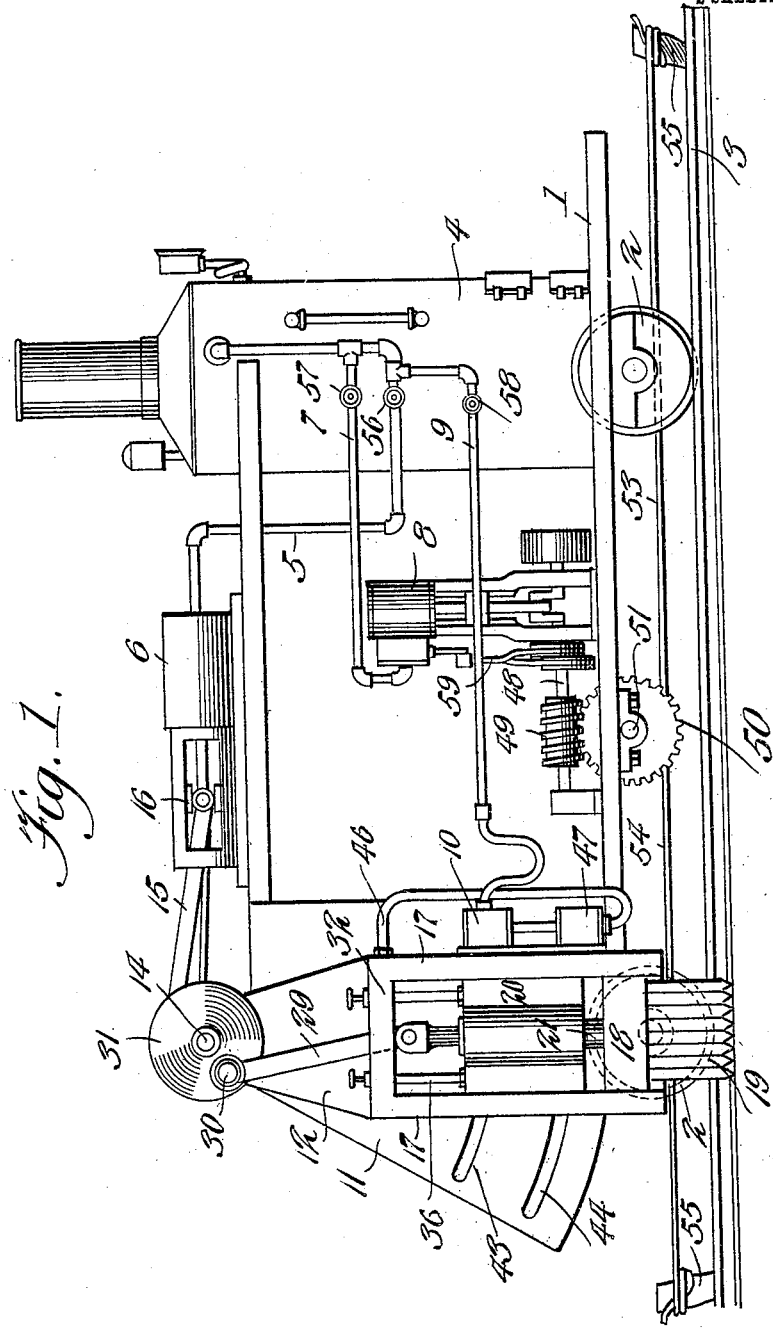

UNITED STATES PATENT OFFICE.

WILLIAM B. BUTLER, OF RUTLAND, VERMONT.

CHANNELING-MACHINE.

No. 925,287.  Specification of Letters Patent.  Patented June 15, 1909.

Application filed June 3, 1908. Serial No. 436,445.

*To all whom it may concern:*

Be it known that I, WILLIAM B. BUTLER, a citizen of the United States, residing at Rutland, in the county of Rutland and State of Vermont, have invented new and useful Improvements in Channeling-Machines, of which the following is a specification.

This invention relates to channeling machines and has for its object the production of a machine which will greatly facilitate the quarrying of stone, the machine being adapted to continuously form channels in the stone without the necessity of intermittently stopping the machine for the purpose of adjusting the lift of the drills.

The machine embodies means for regulating and varying the stroke of the drills, also means for cushioning the stroke of the drills; also means for feeding the machine along the desired path; also means for varying the angle or inclination of the strokes of the drills to accommodate the machine to the class of work necessary to be performed.

With the above and other objects in view, the nature of which will more fully appear as the description proceeds, the invention consists in the novel construction, combination and arrangement of parts as herein fully described, illustrated and claimed.

In the accompanying drawings:—Figure 1 is a side elevation of a channeling machine embodying the present invention. Fig. 2 is a front elevation of the same. Fig. 3 is an enlarged vertical section through the adjustable frame section. Fig. 4 is a detail horizontal section through said frame section and also through the sliding cross head.

The machine contemplated in this invention is mounted on a suitable truck embodying a platform 1 and wheels 2 designed to be mounted upon track rails 3 which determine the direction and extent of movement of the machine. Mounted upon the truck is a steam boiler 4 having in communication therewith a series of steam supply pipes as shown in Figs. 1 and 2, the pipe 5 leading to the drill engine 6, the pipe 7 leading to the feed or propelling engine 8 and the pipe 9 leading to the steam cylinder 10 of an air pump.

Mounted upon one end of the truck are oppositely arranged drills each comprising a stationary frame section 11 and an adjustable frame section 12. The frame sections 11 and 12 are provided at their upper ends with bearings 13 for a horizontal crank shaft 14 from which a connecting rod 15 leads to the cross head 16 of the drilling engine 6, motion being thereby imparted to the crank shaft 14. The adjustable frame section 12 comprises oppositely arranged parallel guides 17 between which works a reciprocatory drilling head 18 holding the drill 19 which may consist of any desired number of drill sections or teeth, the drill, as a whole, being shown as of multiple form. Arranged above the drill head 18 is a reciprocatory cross head 20 that moves with the drill head between the guides 17, the cross head 20 being connected with the drill head 18 by an interposed rod 21. The cross head 20 comprises a central cylinder 22 and air chambers 23 and 24 at opposite sides of the cylinder 22 as clearly shown in Figs. 3 and 4. Within the cylinder 22 there is arranged a movable piston 25, the rod 26 of which extends upward to a stuffing box 27 in a removable plug 28 forming the upper closed end of the cylinder and connected to the rod 26 is a pitman 29 the upper end of which connects to a wrist pin 30 on a disk or balance wheel 31 fast on the crank shaft 14.

The upper ends of the guides 17 are connected by a cap piece 32 which is apertured to admit of the necessary movement of the pitman 29 and said cap piece is provided with air chambers 33 and 34 which communicate with each other to supply air to a pair of tubes 35 and 36 which lead from the chambers 33 and 34 downward through the stuffing boxes 37 into the top of the chambers 23 and 24. One of said chambers is provided with an air inlet port 38 leading into the upper end of the cylinder 22, while the other chamber 24 is provided with an air inlet port 39 leading to the lower end of the cylinder 22 thus providing for the admission of air either above or below the piston 25 for the purpose of raising and lowering said piston and thereby increasing or diminishing the throw of the cross head 20 and correspondingly regulating the throw of the drill. At the same time, the cylinder 22 and piston 25 form air cushions for softening the impact of the drill. The tubes 35 and 36 are controlled by valves 40 and 41 adapted to be manipulated by hand in admitting air to either side of the piston 25, the said valves being arranged in the air chamber in the top of the cap piece 32 of the stationary frame section as shown in Fig. 3. By opening valves 40 and 41 the air pressure on opposite sides of the piston 25 is equalized, permitting said piston to be set at any point in the cylinder 22 to correspondingly adjust the drill in height.

The stationary frame section 11 is provided with curved slots 43 and 44 described in the arcs of circles of which the crank shaft 14 is the center, clamping bolts 45 passing through said slots into the adjustable frame section 12, whereby the adjustable frame section may be swung from a vertical to an angular position and vice versa upon the crank shaft 14 as a center. This enables the drill to be operated either in a vertical plane or in an angular or oblique plane with respect to the vertical. Air is fed to the chamber 33 by means of an air pipe 46 which leads from the cylinder 47 of the air pump which is operated from the steam cylinder 10 supplied by the pipe above referred to.

The feeding or propelling engine 8 embodies a crank shaft 48 on which is fixed a worm 49 which meshes with a worm wheel 50 mounted fast on the shaft 51 of a double drum 52 upon which cables 53 and 54 are wound in opposite directions, the said cables being adapted to be led in different directions and secured to fixed elements 55 such as posts arranged at suitable distance apart.

It will be seen that in the rotation of the drum 52, one of the cables will be wound thereon as the other cable is unwound therefrom resulting in propelling the channeling machine along the track upon which the same is supported, irrespective of whether the track is horizontal or inclined. This feeding or propelling arrangement has been found very effective in practice. It will be understood that the steam supply pipes 5, 7 and 9 are provided with controlling valves 56, 57 and 58 respectively so that either of the engines above described may be under the immediate control of the operator. It will also be understood that the air pump 47 and steam cylinder 10 thereof are duplicated at opposite sides of the machine for the two reciprocatory drills thereby enabling the drills to be independently or simultaneously operated in connection with the feeding or propelling engine. Reversing mechanism may be employed as shown in Figs. 1 and 2, the reversing mechanism therein shown being of the usual link type and the same being connected at 59.

I claim:—

1. A channeling machine comprising a truck, an engine mounted thereon, a crank shaft operated by the engine, a reciprocatory drill-carrying head, a cross head mounted on the guide frame and connected with the drill head, said cross head embodying a cylinder, a piston movable in said cylinder, a pitman interposed between said piston and the crank shaft, air chambers at opposite sides of said cylinder communicating with the spaces at opposite sides of the piston, and valves controlling said air chambers.

2. A channeling machine comprising a truck, an engine mounted thereon, a crank shaft operated by the engine, a reciprocatory drill carrying head, a cross head mounted on the guide frame and connected with the drill head, said cross head embodying a cylinder, a piston movable in said cylinder, a pitman interposed between said piston and the crank shaft, air chambers at opposite sides of said cylinder communicating with the spaces at opposite sides of the piston, air tubes leading to said chambers, and valves controlling said air tubes.

In testimony whereof I affix my signature in presence of two witnesses.

WILLIAM B. BUTLER.

Witnesses:
  JOHN A. WILLIAMS,
  H. H. WILLIAMS.